Jan. 13, 1931. G. DAVIS 1,788,565
COUPLING
Filed Feb. 19, 1930
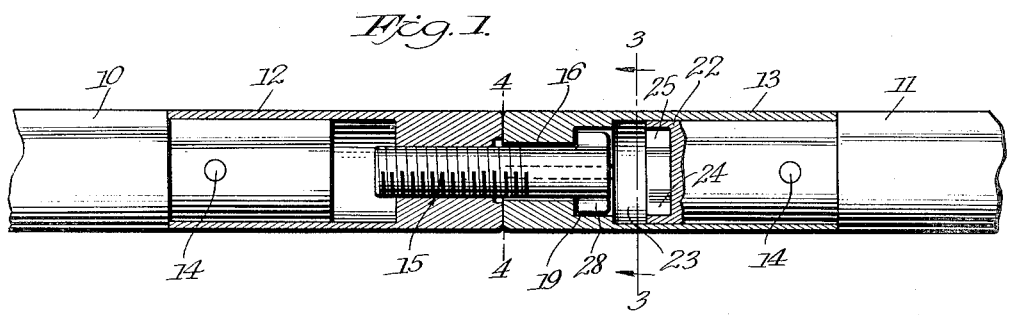
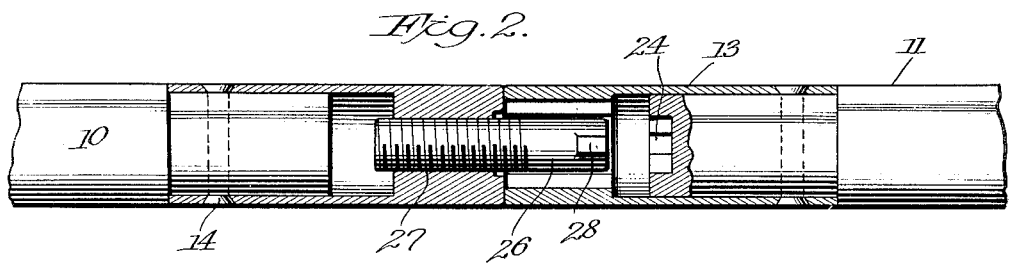
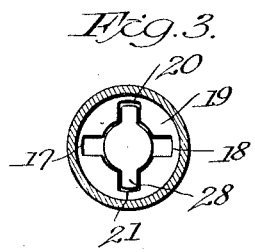 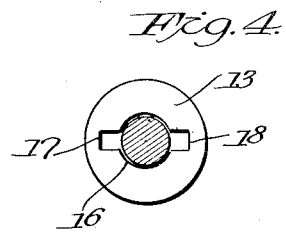
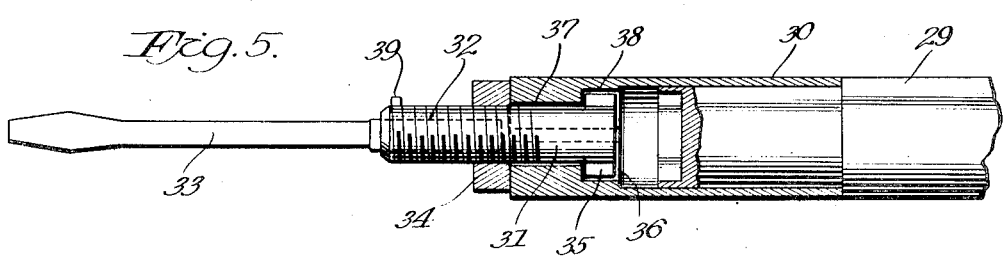
Inventor
Glenwood Davis Patented Jan. 13, 1931

1,788,565

UNITED STATES PATENT OFFICE

GLENWOOD DAVIS, OF POCATELLO, IDAHO, ASSIGNOR OF ONE-HALF TO H. G. A. WINTER, OF AMERICAN FALLS, IDAHO

COUPLING

Application filed February 19, 1930. Serial No. 429,793.

The present invention relates to couplings, and more especially to improved means for positively connecting parts together, such as sectional members, handles, tools, and the like.

An essential object of the invention is to provide a simple, efficient, compact and economical means for detachably securing the parts of a coupling together.

A further object consists in providing a coupling pin or bolt for positively joining the parts together, which pin is formed and constructed so as to cause the parts when connected thereto and rotated towards each other to be brought into firm and tight abutting engagement.

Other objects and advantages will become apparent from the following description when taken in conjunction with the accompanying claims and drawings.

Referring to the drawings in which is disclosed several preferred embodiments of the invention:

Figure 1 is a side elevation of my improved coupling with parts in section.

Figure 2 is a view taken substantially at right angles to Figure 1.

Figure 3 is a sectional view taken substantially along the line 3—3 of Figure 1.

Figure 4 is a sectional view taken substantially along the line 4—4 of Figure 1.

Figure 5 is a side elevation with parts in section of a modified form of the invention.

Referring to the drawings in which like numerals indicate like parts in the several views, 10 and 11 conventionally indicate a pair of members which are to be connected together, and may be formed at their adjacent ends with the sleeve portions 12 and 13 that are secured in position by the transverse pins 14. The sleeve portion 12 has an axially medially disposed threaded opening 15 in the end wall thereof which is arranged to be in alignment with an opening 16 in the sleeve portion 13. The sleeve portion 13 is also provided with diametrically opposed grooves 17 and 18 which extend from the end thereof to an enlarged annular shoulder 19, that has the circumferentially disposed notches 20 and 21 arranged at right angles to the grooves 17 and 18. The shoulder portion 19 is spaced a limited distance from the adjacent end 22 of the member 11, so as to form the chamber 23 while the end 22 is preferably provided with circumferentially disposed notches 24 and 25, arranged in alignment with the notches 20 and 21 on the shoulder portion 19.

The members 10 and 11 are connected together by a coupling pin or bolt 26 which has a threaded end 27 arranged to engage the threaded opening 15 of the sleeve portion 12, and is preferably provided adjacent its opposite end with the radially extending lugs 28, that slidably engage in the grooves 17 and 18, so that when the bolt is moved inwardly a sufficient distance as to pass the end of the opening 16, the lugs 28 may be rotated to fit into the notches 20 and 21, to prevent rotation of the pin 26 independently of the member 11. Moreover, the coupling pin may be moved further inwardly into the chamber 23, so as to cause the lugs 28 to engage the notches 24 formed in the end of the member 11 for initially preventing rotation of the pin 26 when the coupling is being set up.

In operation, the coupling is set up by first inserting the lugs 28 of the coupling pin 26 into registration with the grooves 17 and 18, and moving the coupling pin inwardly until the lugs 28 engage the notches 24, in which position the coupling is prevented from rotating independently of the member 11. Then the member 10 is threaded through the opening 15 on to the coupling pin a limited distance, at which point the member 10 may be moved away from the member 11 to cause the lugs 28 to be brought into locking engagement with the notches 20 and 21, and upon further rotation of the members 10 and 11 relative to each other, they will be drawn together in abutting engagement so as to assume the position as shown in Figs 1 and 2. Conversely, when it is desired to dismantle the coupling, the member 10 is removed from the pin 26, and upon turning the latter so as to cause the lugs 28 to be brought into registration with the grooves 17 and 13, it will permit the pin 26 to be withdrawn from the member 11. It will be observed that the coupling pin 26, when the parts are being set up, causes the members 10 and 11 to be brought into rigid abutting engagement so as to provide a firm and positive joint between the parts.

It will be seen that the invention is capable of use with all kinds and types of rods, poles, tool-handles, and may be readily dismantled so as to assume a compact form. Moreover, due to the rigid and firm joint formed by the coupling, it may be conveniently substituted for long poles or members so as to reduce cumbersome or lengthy equipment without sacrificing its rigidity, strength, and efficiency.

The modification of the invention shown in Figure 5, discloses one of the many uses to which the invention may be applied and, in this figure, the member 29 and sleeve 30, which may be substantially similar in construction to the parts 11 and 13, previously described, constitutes a tool-handle, while the pin or bolt 31 may be provided with an axially disposed polygonal spaced socket 32 extending from one end thereof and arranged to detachably receive the shank of any suitable tool, such as a screw driver 33. A locking nut 34 threadedly engages the pin 31, so that when the lugs 35 are moved into the chamber 36 of the sleeve 30, through the grooves formed in the wall opening 37 similar to the grooves 17 and 18, previously described, and the pin 31 turned, the lugs 35 will be brought into locking engagement with notches 38 for preventing rotation of the pin relative to the handle. It will be seen, upon the turning of the handle 29 relative to the locking nut 34, that the pin 31 will be forced into binding engagement with the notches 38 to prevent either rotative or axial movement of the screw driver 33 relative to the handle 29. A lug 39 on the pin 31 tends to prevent removal of the nut 34 therefrom.

It is to be understood that the several forms of the invention herewith shown and described are merely illustrative of preferred embodiments, and that such changes and modifications may be made therein as fall within the purview of one skilled in the art without departing from the spirit of the invention and the scope of the appended claims.

I claim:

1. In combination, a pair of connecting members having axially aligned openings, the wall opening in one of said members being threaded and the other of said members having an annular shoulder formed at a point remote from the end thereof, said shoulder having opposed notches and diametrically disposed longitudinal grooves arranged at an angle to said notches and extending from said shoulder to the end of said member, a coupling member having radially disposed locking lugs arranged to slidably engage said grooves and be moved into locking engagement with said notches, and means in the wall of one of said members for preventing rotation of said coupling member when said lugs are moved axially out of engagement with said notches.

2. In combination, a pair of detachable connecting members, the adjacent ends of said members having sleeve portions secured thereto, one of said sleeve portions having an axially threaded opening in alignment with an opening in the other of said portions, said last mentioned portion having diametrically opposed grooves in its wall opening, an annular shoulder remote from the end thereof, said shoulder having circumferentially disposed notches, one of said members having notches in the wall thereof in alignment with the notches in said shoulder, a coupling member having a threaded end arranged to engage said threaded opening and radial lugs adapted to slidably engage said grooves and fit in said notches to prevent independent rotation of the coupling member.

3. In combination, a pair of detachable connecting members, the adjacent ends of said members having sleeve portions secured thereto, one of said sleeve portions having an axially threaded opening in alignment with an opening in the other of said portions, said last mentioned portion having diametrically opposed grooves in its wall opening, an annular shoulder remote from the end thereof, said shoulder having circumferentially disposed notches, a coupling member having a threaded end arranged to engage said threaded opening and radial lugs adapted to slidably engage said grooves and fit in said notches to prevent independent rotation thereof, and locking means formed in one of said members and arranged to receive said lugs when the latter are moved rearwardly out of engagement with said notches so as to prevent rotation of the coupling member.

4. In a device of the class described, a handle member having an axial opening terminating at a point remote from the end of said member in an enlarged shoulder, said shoulder having circumferentially disposed notches and the wall of said opening having a diametrically disposed longitudinal groove arranged at an angle to said notches, said handle member adjacent said shoulder being provided with a chamber having notches in the opposed wall thereof in alignment with the notches in said shoulder, and an externally threaded bolt having radial lugs adjacent one end thereof, said lugs arranged to slidably fit in said groove and selectively engage said notches, and means threaded on said bolt and abutting said handle member for forcing said lugs into locking engagement with the notches on said shoulder.

In testimony whereof I have hereunto set my hand.

GLENWOOD DAVIS.